United States Patent
Dupuy et al.

(10) Patent No.: US 6,523,171 B1
(45) Date of Patent: Feb. 18, 2003

(54) ENHANCED SOURCE CODE TRANSLATOR FROM PROCEDURAL PROGRAMMING LANGUAGE (PPL) TO AN OBJECT ORIENTED PROGRAMMING LANGUAGE (OOPL)

(75) Inventors: Jean-Christophe Dupuy, Le Cannet (FR); Martine Linares-Langloys, Cannes (FR); Rémi Piro, Cannes (FR); Marc Fiammante, St Laurent du var (FR); Eric Menguy, Nice (FR); Patrick Boeuf, La Gaude (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/450,076

(22) Filed: Nov. 29, 1999

(30) Foreign Application Priority Data

Dec. 29, 1998 (FR) .......................... 98 480104

(51) Int. Cl.⁷ ............................... G06F 9/45
(52) U.S. Cl. .................. 717/136; 717/136; 717/137; 717/142
(58) Field of Search ................ 717/114, 116, 717/136, 137, 143, 159, 165, 120, 122, 141, 148; 707/203, 511

(56) References Cited

U.S. PATENT DOCUMENTS

| | | | | |
|---|---|---|---|---|
| 5,678,039 A | * | 10/1997 | Hinks et al. .................... | 707/4 |
| 5,761,511 A | * | 6/1998 | Gibbons et al. ............. | 717/122 |
| 5,878,385 A | * | 3/1999 | Bralich et al. .................. | 704/9 |
| 5,953,526 A | * | 9/1999 | Day et al. .................... | 717/108 |
| 6,032,993 A | * | 2/2000 | Andrews et al. ............. | 717/143 |
| 6,072,953 A | * | 6/2000 | Cohen et al. ................ | 717/166 |
| 6,145,120 A | * | 11/2000 | Highland ..................... | 717/106 |
| 6,145,121 A | * | 11/2000 | Levy et al. .................. | 717/135 |
| 6,158,045 A | * | 12/2000 | You ............................ | 717/124 |
| 6,182,281 B1 | * | 1/2001 | Nackman et al. ........... | 717/116 |
| 6,269,475 B1 | * | 5/2001 | Farrell et al. ................ | 717/113 |
| 6,346,945 B1 | * | 2/2002 | Mansurov et al. .......... | 345/473 |
| 6,366,664 B1 | * | 4/2002 | Pullen et al. ............... | 379/237 |
| 6,438,573 B1 | * | 8/2002 | Nilson ........................ | 709/100 |

OTHER PUBLICATIONS

Auslander et al. "Fast, effective dynamic compilation", ACM PLDI, 1996, pp 149–159.*
Hsieh et al, "Java bytecode to native code translation: the caffeine prototype and preliminary results", IEEE, 1996 pp 90–97.*
Cox et al, "Produce: A tool for translating smalltalk–80 to objective C", ACM OOPSLA, 1987, pp 423–429.*
Buddrus et al, "Cappuccino– A C++ to Java Translator", ACM, 1998, pp 660–665.*

* cited by examiner

*Primary Examiner*—Anil Khatri
(74) *Attorney, Agent, or Firm*—Steven W. Roth

(57) ABSTRACT

A method for translating source code programs written in a procedural computer language in source code programs written in an Object Oriented language. The method of the invention provides a parser which adds to the lexicographic and syntactical analysis of the source code a semantic analysis: a parser is written for identifying the semantic patterns in the source code. At execution, the parser reads the instructions of the procedural language and classify the sequences of instructions identified as using a known pattern. According to the matched patterns, the parser creates different categories of classes containing both functional (linearly translated code) or references to other object instances. Each time an object is discovered in the code it is stored in an Object Dictionary with its description and reused when referred later in the code. The parser is executed for each program and at each execution new classes and new objects are created; when all the programs are translated the OO classes and objects form the target object model.

7 Claims, 3 Drawing Sheets

ENHANCED SOURCE CODE TRANSLATOR FROM PROCEDURAL PROGRAMMING LANGUAGE (PPL) TO AN OBJECT ORIENTED PROGRAMMING LANGUAGE (OOPL)

TECHNICAL FIELD

This invention relates to writing of computer programs in source code and more particularly to a process for automatically translating programs written using a procedural programming language into programs written using an object oriented programming language.

BACKGROUND ART

In computer programs written using a procedural language, the programmer specifies an explicit sequences of steps to follow to produce a result. Variables, first defined in the program, are used in the steps of the procedural language. The drawbacks of a procedural language is that the code produced is very specific to the physical implementation of the data processed and very specific to the view the user has of this data. This has a huge impact on the user's workload in maintaining these programs and further limits program reuse.

Object oriented (OO) languages have been created to overcome the drawbacks of procedural languages. The starting point is to build a user's model by creating "objects." These objects are "data structures" encapsulated with a set or routines called "methods" which operate on the data. An Object has "attributes." An example would be the attribute employee number (5 digits) of an employee object. An access method could be "get employee." Operations on the data can only be performed via these methods. Objects having similar behavior (this is the observable effect of performing a method) can be grouped in the same "class." A class is an object definition describing a category of objects and an object is an instance of a class. Classes are arranged in a class hierarchy: it must be possible to create classes and subclasses and let objects in a subclass "inherit" eveything from their super classes. In an object-oriented developed application, objects use the services of other objects, which in turn use the service of other objects and so on.

In programming using object oriented languages, a programmer's first task is to design a model of basic business objects along with how they interact with each other in order to provide the functions which are requested by the end user.

Because the model is independent of the location of the data or the data base structure, the main advantage of OO languages is the reusability of code. Reusable code in an OO system are "black boxes," the only thing that needs to be understood when using the code is their interfaces, not their implementation. Well designed classes and the structure of the class hierarchy will be a major factor determining the reusability of objects. Other advantages of the OO languages are the correctness and the maintainability of the code. OO software development cuts cost, shortens development time, and lowers maintenance cost.

For all the advantages of OO programming languages, many existing applications or part of applications written in procedural languages need to be translated into an OO language. When done manually this represents a huge amount of work as the first step will consist first in designing the data structure (objects, classes) corresponding to the application executed by the procedural language code. The design phase cannot be accomplished from the unique procedural code but from an initial functional analysis of the application which is not always available.

Known translators of the prior art first perform a lexical analysis of the input source code. The stream of characters making up the source code is read one at a time and grouped into tokens, word-like pieces such as keywords, identifiers, and punctuation. The translators of the prior art then perform the syntactical analysis, discovering the structure of strings which is described by a grammar. VB2Java is such a translator, which translates Visual Basic to Java. The common language translators working at lexical and syntactical level leave a high percentage of manual rework to complete the translation. With prior art translators, each variable of the procedural language code is mapped to a class attribute, the result of the translation being one single class per source code program The resulting code, even if it can be compiled by a OO language compiler, provides a simplified OO model and thus limits the capability of code reuse and flexibility. This is particularly the case when the initial language to be translated has higher semantic capabilities. The meaning of the language is given by its semantics. The study of meaning and changes of meaning is performed by a semantic analysis. Current translators knowing only the language syntactical grammar fail in translating towards languages having more complex semantics. This implies that when the target language is an OO language, the objects resulting to higher levels of semantics are not identified, meaning that there is no code reuse and thus benefit to translating into an OO language.

SUMMARY OF THE INVENTION

In brief, it is an object of the invention to provide a method to translate a procedural source code to Object Oriented (OO) source code characterized in that it comprises the steps of:

1. defining the patterns of the procedural source code according to the semantic grammar of said procedural language;
2. performing a lexical and syntactical reading of the procedural source code and determining the sequences of instructions in procedural source code corresponding to the identified patterns;
3. identifying new objects, attributes, access methods to objects or access methods to attributes identified in said sequences and storing them in an Object Dictionary; and
4. for each said sequence of source code, if not yet existing, creating a new type of OO classes, and new OO source code classes using the objects of said Object Dictionary.

With the translator of the invention, once the source code programs of an application are translated a complete object model is also generated; it allows reuse of code, use of distributed architecture and flexibility.

BRIEF DESCRIPTION OF THE DRAWINGS

The foregoing and other objects, aspects, and advantages will be better understood from the following detailed description of a preferred embodiment of the invention with reference to the drawings in which.

DETAILED DESCRIPTION OF THE PREFERRED EMBODIMENT

Figure 1:
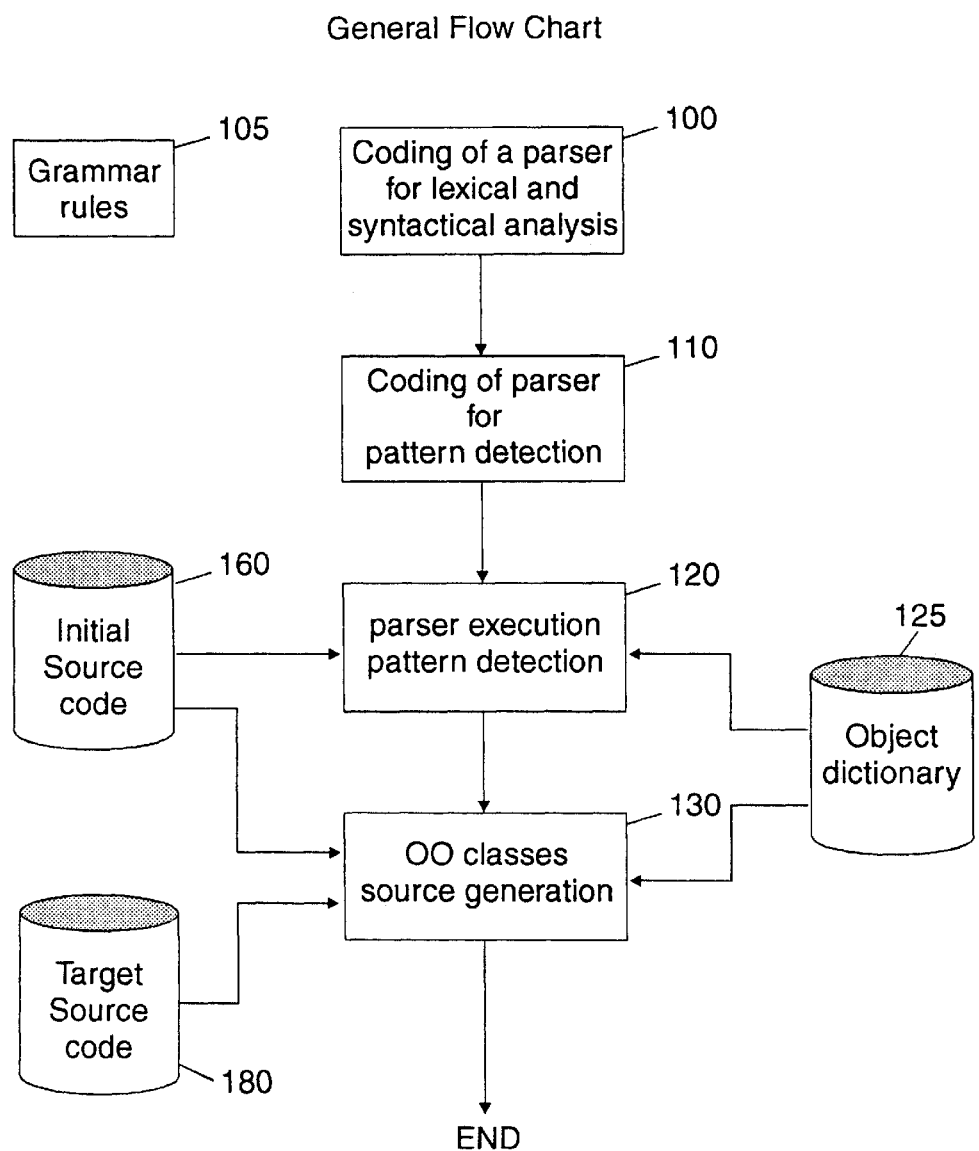
FIG. 1 shows a general flow chart of one embodiment of the invention

FIG. 1 shows the flow chart of the method to translate an initial source code (160) written in a procedural language into a target source code (180) written in an object oriented language according to the preferred embodiment. This could be, for example, a translation of an application comprising programs written in Nat Systems-Development Kit (NS-DK) language in application programs written in Java (product and trademark of Sun Microsystems Inc.) language. The first step (100) consists in creating a parser which is a program able to read the initial source code and to identify syntactical sequences according to the lexical and syntactical grammar rules (105) and being able to relate the syntactical sequences to their translation in the target source code. The parsers of prior art prepare the translation of initial source code on the fly: same lines of code are repeated each time a same syntactical sequence is identified by the parser. In the parser of the preferred embodiment, is further coded (110) a function of semantic pattern recognition; patterns are sequences of tokens having a specific meaning in the initial language according to the semantic grammar rules. This is done by identifying in the source code the instructions or group of instructions according to the semantic grammar nodes selected in the semantic tree. This kind of analysis is used also for analysis and translation of high level languages. This semantic aspect of the initial language is taken in consideration as the parser at execution (step 120) reads one source code program of the application (160) and identifies sequences of code as relevant known patterns; then, it classifies the sequences of code per categories which will become separated OO classes in the target OO language. According to the matched pattern, the parser creates different categories of source code classes containing both functional code (issued from a linear translation) or references to other object instances.

As an example, if the following NS-DK source code sequence has been identified, according to the patterns EVENT . . . ENDEVENT, WHILE . . . ENDWHILE, func:

EVENT ACTIVATED Window 12
        WHILE (A=1)
            B=func(A);
        ENDWHILE;
    ENDEVENT When EVENT . . . ENDEVENT is encountered for the first time, a new class inheriting from one of the "EVENT Handler" classes is created for this specific event characterized by the code. Inside the EVENT pattern is found the "WHILE . . . ENDWHILE" pattern and Java code is generated correspondingly. It is noted that the sequence of the keyword "ACTIVATED" followed by the variable Window 12 (a window in this case) which has been encountered sooner in the source code read, allow the parser to define the real nature of the event handler type: it is a "window event handler." The translator of the prior art would not generate a separate reusable handler class in this case but would rather provide a linear translation of the all code.

The parser uses an Object Dictionary (125) as a repository with objects, their corresponding attributes and access methods to objects and attributes. The parser at execution feeds the Object Dictionary each time a new object is encountered. In the procedural language as the variables are declared prior to their use (the input program source code is assumed to be correct), the parser reuses one object by looking for it in the dictionary when it is used in the code. In the previous example of EVENT . . . ENDEVENT pattern, the variables A, B and func could have been already identified as objects in the preceding source code and are searched in the object dictionary or, these are new object which are stored at this time in the dictionary. More particularly, we suppose that the variable "Window 12" has been found in the Object Dictionary and has been recognized as a window.

In the preferred embodiment, the generation of the Java source code (step 130) is done in the same program execution: the target source code entities are the "Java" files containing the Java source code classes.

The parser (120, 130) is repeatedly executed for all the source code programs of the application; at the end of all these parser executions, the classification is final, the object dictionary is complete, and the Java classes (".Java" files) are representing the final object model of the application.

Figure 2:
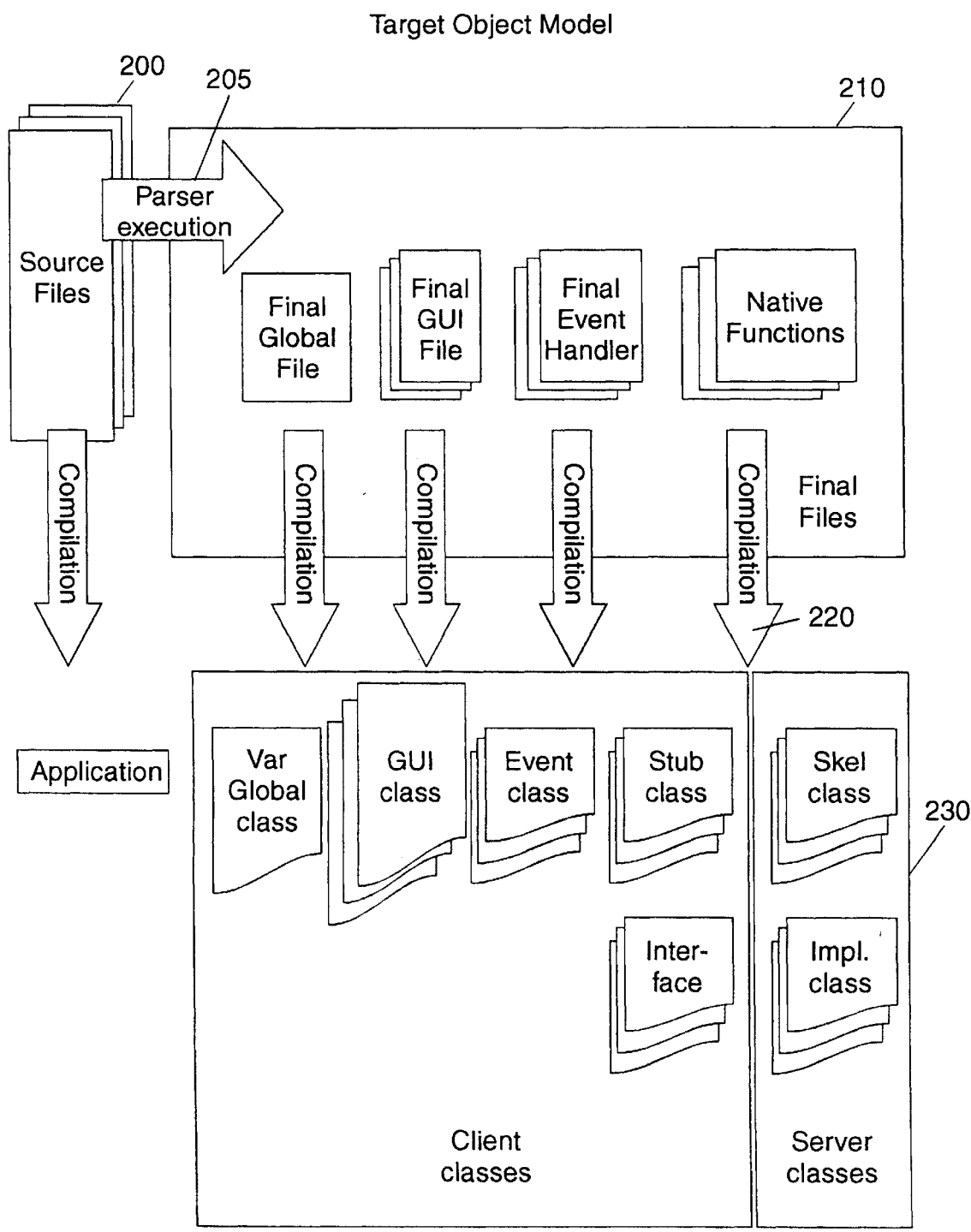
FIG. 2 illustrates the target model obtained after translation of an initial source code in procedural language to a target source code following the client/server architecture.

FIG. 2 illustrates the target object model built with the target OO code provided by the translator of preferred embodiment. The left part of the figure illustrates the compilation of the source code programs written in the procedural language (200) into executable code forming the application. With the translator of the preferred embodiment, the parser when executed, (205) generates the hierarchized source code classes stored in files (the "java" class files) according to the pattern recognized participating in the target object model. For variables identified as usable by all the programs of the application, a GLOBAL class is identified: this will generate the Java GLOBAL classes. One other group of classes is identified: the Graphic User Interface (GUI) components, this will generate the Java GUI source code classes (A specific screen will be a specific GUI class). The event handlers are identified classes which will generate event classes in Java code. Also the functions identified in the code are classified separately and will generate other Java classes. On this specific example in the preferred embodiment, it is shown that with the translator of the preferred embodiment, the "interface," "implementation," "stub," and "skeleton" classes which are the basis of the client server architecture so called Java Remote Method Invocation (RMI) can be generated also in the target OO application. As a matter of fact, applications need more and more to run in a distributed environment supporting "client server" approach. The RMI architecture allows this approach: each time an "external function" (also called native) is called, the request is captured by the stub class function operating in the "client" environment, which sends the request for execution to the server environment classes, the "skeleton classes." The "interface class" is for the client view of the remote (can be on one other physical place) external function execution; the "implementation class" is the server ridge for local function execution. One example of translation from NS-DK to Java with generation of RMI classes is given below:

in NS-DK we have:
    function evalRate(int x, int y)return int external "financiallib.dll"
    the parser generates a new Java source code class according to the Java RMI architecture:
    "financiallib.Java"
    It generates also the access code (Java Native Interface) to the external (or native) "financiallib.dll" library.
    It generates an entry in the Object dictionary: evalRate.
    Later in the source code is encountered a reference to the evalRate method:
    rate=evalRate(12, NbrOfYear)
    The entry of the Object dictionary allows to find back a reference to evalRate and to generate the access code:

```
try (
    rate = financiallib.evalRate(12, nbrOfYear);
) catch(RemoteException e) (
    globalHandleException( e );
)
```

Coming back to FIG. 2, once final files are obtained by executing a translation for all the programs of the application, the Java compilation (220) provides the executable ".class" files of the application (230).

Figure 3:
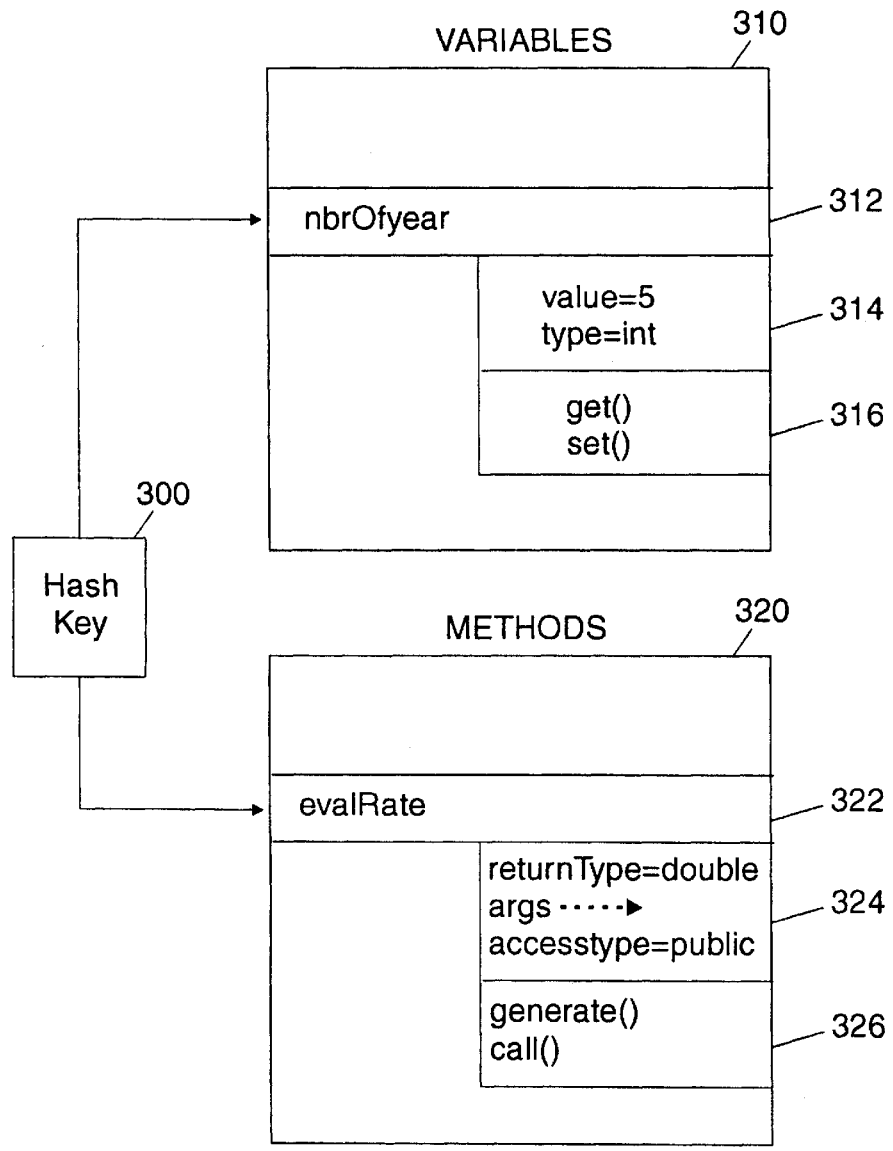
FIG. 3 illustrates the Object Dictionary structure.

FIG. 3 describes the structure of the Object Dictionary used by the parser during execution. In the preferred embodiment this Dictionary is kept the in computer storage during the translation of the source code programs of the application and canceled from storage at the end of translation execution. One possibility could be to keep the Object Dictionary in a permanent storage at the end of translation execution because the user of the application may ask for keeping a trace of all the objects of the application. In the preferred embodiment the Object Dictionary comprises two hash tables one for storing the variable definitions (310 and 320) accessible via a hash key (300) which is this embodiment the variable name or the method name. As illustrate with the entry "nbrOfyear" (312) in the variable table and with the entry "evalRate" (322) in the method table, each entry in these tables contains the attributes (314, 324) and methods (316, 326) relevant to the stored type of variable or method. The attributes of nbrofyear are its value (5) and its Java object type, here an integer. The method to access this object are get nbrofyear and set nbrofyear to an integer value. The attributes of the method evalRate (also called function) are the return source code type which is here a double precision real number, the arguments which are the parameters needed by the function and the access type which is here "public" that is to say that any user can access this function. It is noted that the "args" keyword points to a list of argument which can be stored in one storage area. The two methods associated to evalRate are "generate( )" the function and "call" for executing the function code. In brief, the Object Dictionary will be used by the parser to identify object types and inherited class type these information are used by the parser to generate the Java source code in the preferred embodiment.

While the invention has been described in terms of preferred embodiments, those skilled in the art will recognize that the invention can be practiced with modifications within the spirit and the scope of the appended claims.

What is claimed is:

1. A method to translate procedural source code to Object Oriented (OO) source code comprising the steps of:
   a) defining patterns of said procedural source code according to a semantic grammar of said procedural language;
   b) performing a lexical and a syntactical reading of said procedural source code and determining sequences of instructions in said procedural source code corresponding to said identified patterns;
   c) identifying new objects, attributes, access methods to objects or access methods to attributes identified in said sequences and storing them in an Object Dictionary; and
   d) for each said sequence of source code, if not yet existing, creating a new type of OO class, and new OO source code classes using said Object Dictionary.

2. The method of claim 1 further comprising the step of:
   repeating steps b to d for all source code programs of one application.

3. The method of claim 1 wherein said procedural source code language is Nat Systems-Development Kit (NS-DK) language and said OO language is Java.

4. The method of claim 1 wherein at least one pattern identified in step b is an external function and that the corresponding OO source code classes created in step d are a stub class, a skeleton class, an interface class, and an implementation class according to the Remote Method Invocation distributed architecture.

5. The method of claim 1 wherein said Object Dictionary comprises two hash tables accessed by object name, a first hash table of said two hash tables storing variable object definitions and a second hash table of said two hash tables storing method object definitions.

6. A program product for translating procedural source code to Object Oriented (OO) source code, said program product comprising:
   a translator, said translator configured to perform the following steps,
      a) defining patterns of said procedural source code according to a semantic grammar of said procedural language;
      b) performing a lexical and a syntactical reading of said procedural source code and determining sequences of instructions in said procedural source code corresponding to said identified patterns;
      c) identifying new objects, attributes, access methods to objects or access methods to attributes identified in said sequences and storing them in an Object Dictionary;
      d) for each said sequence of source code, if not yet existing, creating a new type of OO class, and new OO source code classes using said Object Dictionary; and
   a storage medium, said translator being stored on said storage medium.

7. The program product of claim 6 wherein said translator is further configured to perform the step of:
   repeating steps b to d for all source code programs of one application.

* * * * *